Figures 1, 2, 3:
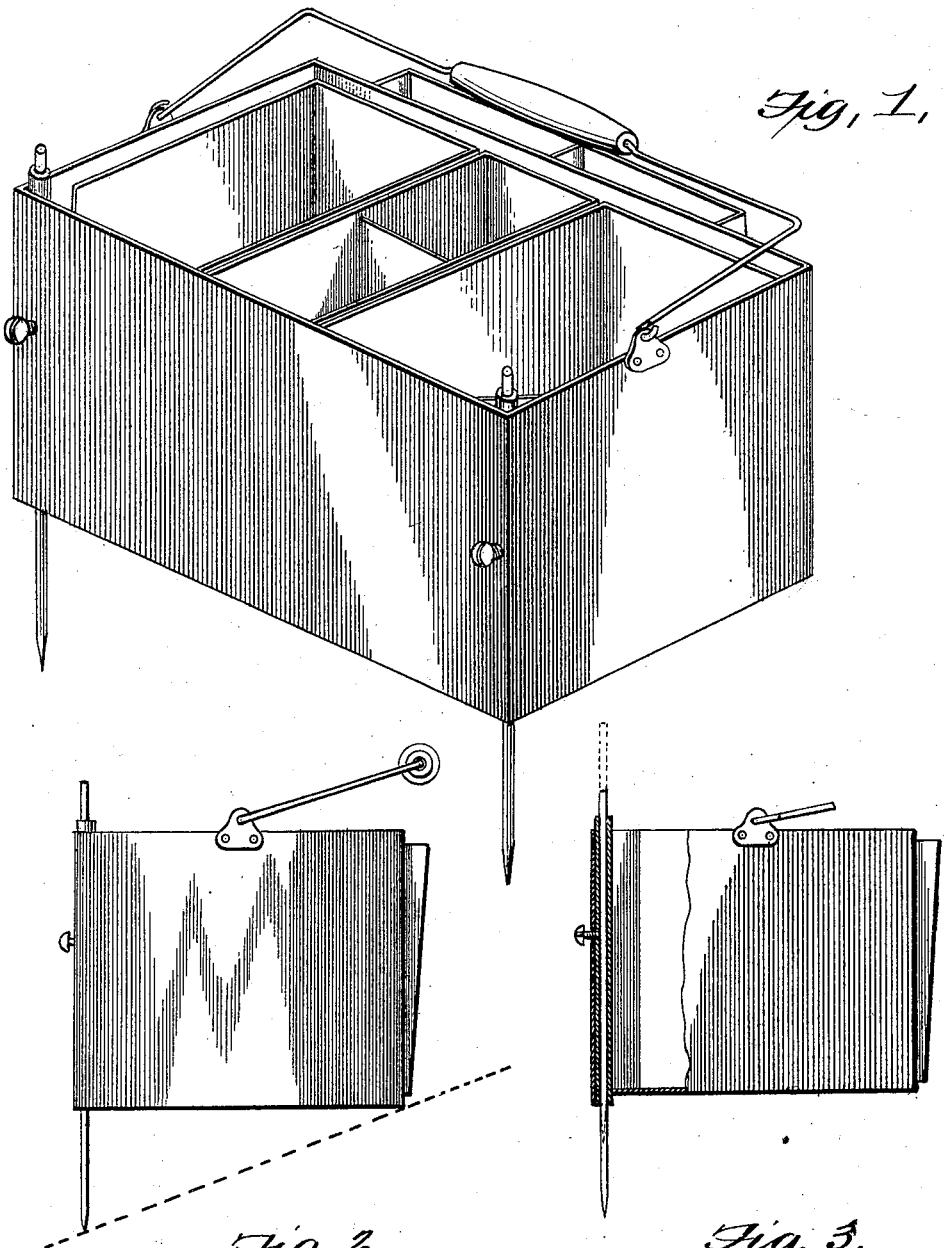

(No Model.)

H. G. THOMPSON.
COMBINATION PAINT BUCKET.

No. 606,100. Patented June 21, 1898.

Henry Gilbert Thompson
INVENTOR

WITNESSES:
Duane E. Fox.
John W. Brauner.

BY
Watson E. Coleman
ATTORNEY.

UNITED STATES PATENT OFFICE.

HENRY GILBERT THOMPSON, OF HOLLISTER, CALIFORNIA, ASSIGNOR OF ONE-HALF TO JOHN DOTTINGER, OF SAME PLACE.

COMBINATION PAINT-BUCKET.

SPECIFICATION forming part of Letters Patent No. 606,100, dated June 21, 1898.

Application filed February 1, 1897. Serial No. 621,522. (No model.)

*To all whom it may concern:*

Be it known that I, HENRY GILBERT THOMPSON, of Hollister, in the county of San Benito, State of California, have invented certain new and useful Improvements in Paint-Buckets; and I do hereby declare the following to be a full, clear, and exact description of the same.

This invention relates to certain new and useful improvements in paint-buckets; and it has for its object the production of a bucket of this character by means of which separate paints of various colors may be conveniently carried at one time and in which the paint-receptacles will always occupy a horizontal position, even when the vessel is resting on an inclined plane.

The invention will be hereinafter fully set forth, and particularly pointed out in the claim.

In the accompanying drawings, Figure 1 is a view in perspective, illustrating my invention. Fig. 2 is an end view thereof. Fig. 3 is a similar view with parts broken away.

Referring to the drawings, A designates a bucket or receptacle, preferably rectangular in form, having a bail $a$ secured to its ends. To the exterior of one of the sides of bucket A is secured a supplemental casing $a'$, having a partition $a^2$, which divides said casing into separate pockets $a^3$ to accommodate brushes and the like.

B designates a series of removable buckets or receptacles, the same being of such shape as to rest in and normally fill the interior space of receptacle A, said buckets being designed to contain paints of different kinds or color or the materials for mixing the same. One corner of each of the end buckets is beveled to provide spaces for vertically-disposed sleeves $d$. In these sleeves fit upright rods D, having lower pointed ends $d'$. These rods D are adjustable in said sleeves and are held at any point by means of set-screws $d^2$, extending through the sleeves and one side of receptacle A. By raising or lowering these rods the receptacle can be made to always occupy a horizontal position, even when located on an inclined roof.

The advantages of my invention will be at once apparent to those skilled in the art to which it appertains. It will be particularly noted that paints of various colors or the ingredients therefor, together with the necessary brushes, may be readily and conveniently carried in one receptacle, and when working on an inclined plane, such as a roof, the adjustable rods will serve to always keep the buckets level or in a horizontal position.

I claim as my invention—

The herein-described paint-bucket, comprising a receptacle having exterior pockets, a series of removable buckets located in said receptacle, sleeves located inside of said bucket in opposite corners of the latter, and pointed rods held in said sleeves and capable of independent adjustment, said rods being designed to extend at their lower ends below said receptacle, substantially as set forth.

HENRY GILBERT THOMPSON.

Witnesses:
H. W. SCOTT,
GEORGE FÜRSTENHÖFER.